United States Patent [19]

Furusawa et al.

[11] 4,265,412
[45] May 5, 1981

[54] FILM WIND-UP DEVICE FOR A CAMERA

[75] Inventors: Motoyoshi Furusawa, Shobumachi; Motohiko Horio, Iwatsuki; Shyuichi Togashi, Tokyo; Akio Ohmiya, Omiya, all of Japan

[73] Assignee: Fuji Photo Optical Co., Ltd., Saitama, Japan

[21] Appl. No.: 74,309

[22] Filed: Sep. 11, 1979

[30] Foreign Application Priority Data

Sep. 13, 1978 [JP] Japan .................................. 53-112842

[51] Int. Cl.³ ............................................... G03B 1/06
[52] U.S. Cl. .................................................. 242/71.4
[58] Field of Search ........................ 242/71.4, 71, 71.3, 242/71.5, 71.6; 354/212, 213, 214

[56] References Cited

U.S. PATENT DOCUMENTS

| 3,021,773 | 2/1962 | Hintze | 242/71.4 X |
| 3,645,182 | 2/1972 | Kimura | 242/71.4 X |
| 4,146,189 | 3/1979 | Sunouchi | 242/71.4 |

Primary Examiner—Edward J. McCarthy
Attorney, Agent, or Firm—Pasquale A. Razzano; Harold L. Stults

[57] ABSTRACT

In a film wind-up mechanism of a photographic camera, a wind-up shaft to which a wind-up lever is fixed is divided into an upper portion and a lower portion. The wind-up lever is fixed to the upper portion, and the lower portion is fixed to a spool gear for driving a film take-up spool. A friction means is provided between the spool gear and the take-up spool.

5 Claims, 2 Drawing Figures

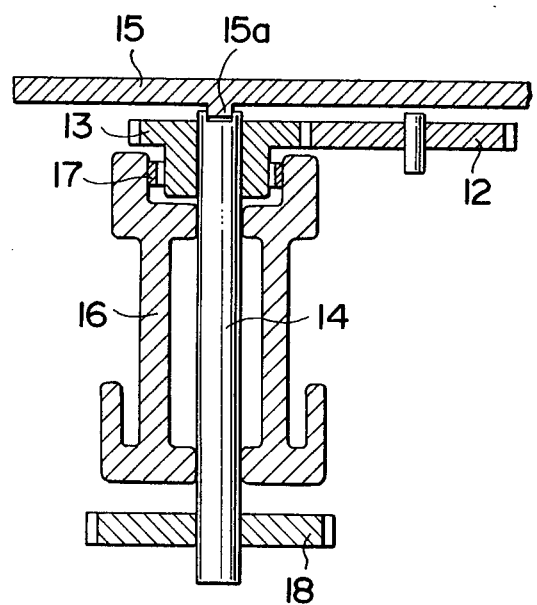

FILM WIND-UP DEVICE FOR A CAMERA

BACKGROUND OF THE INVENTION

1. Field of the Invention

This invention relates to a wind-up mechanism for a camera, and more particularly to a film wind-up device for a photographic camera.

2. Description of the Prior Art

In the conventional film wind-up mechanism, the wind-up shaft is provided with a wind-up lever secured to the upper end thereof, a film take-up spool rotatably mounted on the intermediate portion thereof, and a drive gear secured to the lower portion thereof for charging a shutter mechanism. The film wind-up shaft is generally rotated by 120° to 180°. The rotation of the wind-up shaft is transmitted to the spool gear through a rachet mechanism and gear train. The spool gear and the take-up spool are friction coupled to each other so that the take-up spool is rotated by about 360° to wind up one frame of the film upon drive of the spool gear. On the other hand, the drive gear for charging the shutter is secured to the lower portion of the film wind-up shaft and is rotated 120° to 180° together with the wind-up lever to charge the shutter.

In the above mentioned wind-up mechanism, the spool gear and the take-up spool are freely mounted on the wind-up shaft and a friction plate is interposed between the spool gear and the take-up spool. Therefore, while the wind-up shaft is rotated 120° to 180°, the spool gear and the take-up spool are rotated about 360°, and accordingly slippage occurs therebetween and a large torque for winding up the lever is needed. Particularly when the film wind-up shaft and the take-up spool are rotated in the opposite directions, the above drawbacks becomes prominent.

SUMMARY OF THE INVENTION

The primary object of the present invention is to provide a film wind-up mechanism for smoothly and lightly winding up a film in a camera.

The film wind-up device in accordance with the present invention is characterized in that the wind-up shaft is divided into the upper wind-up shaft and the lower wind-up shaft in which the upper wind-up shaft is provided with a wind-up lever and a ratchet mechanism secured thereto and the lower wind-up shaft is provided with a spool gear secured thereto and a take-up spool rotatably mounted thereto.

In accordance with the present invention, therefore, there is no slippage between the take-up spool or spool gear and the wind-up shaft and accordingly the wind-up motion can be lightened and facilitated.

BRIEF DESCRIPTION OF THE DRAWING

FIG. 2 is a vertical sectional view taken generally along line 2—2 of FIG. 1 showing the take-up spool employed in the present invention.

DESCRIPTION OF THE PREFERRED EMBODIMENT

Figure 1:
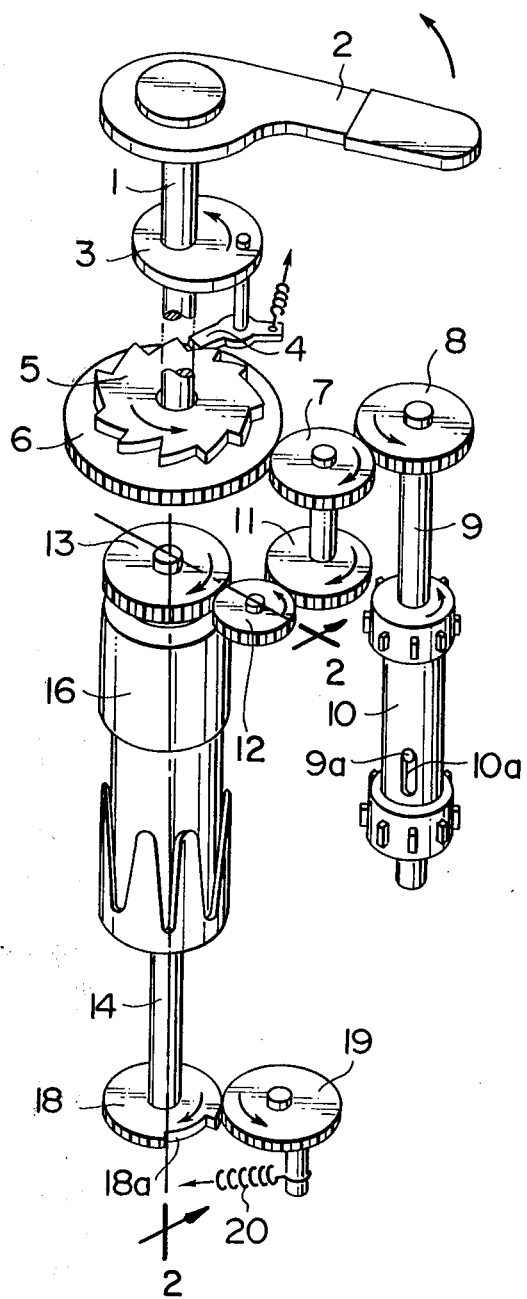
FIG. 1 is a perspective view showing the whole system of the film wind-up mechanism in accordance with an embodiment of the present invention.

Referring to FIG. 1, a film wind-up lever 2 is secured to the upper end of the upper portion of the wind-up shaft 1. On the intermediate portion of the upper portion of the wind-up shaft 1 is secured a disc 3 to be rotated together with the upper portion of the wind-up shaft 1. On the lower face of the disc 3 is pivotally mounted a feed claw 4 to be engaged with a ratchet gear 5 freely mounted on the lower portion of the upper shaft 1. The ratchet gear 5 is provided with a wind-up gear 6 integrally fixed thereto.

The rotation of the wind-up gear 6 is transmitted to a gear 8 by way of an intermediate gear 7. The gear 8 is secured to a sprocket shaft 9 which is provided with a sprocket 10 freely mounted thereon. By engagement of a pin 9a fixed to the sprocket shaft 9 and an elongated hole 10a provided in the sprocket 10, the sprocket shaft 9 and the sprocket 10 are rotated together.

A gear 11 mounted on the same shaft as the intermediate gear 7 concentrically therewith rotates with gear 7 and drives a spool gear 13 by one rotation by way of a gear 12. The spool gear 13 is secured to the lower portion of the wind-up shaft (spool shaft) 14.

As shown in FIG. 2, the lower portion of the wind-up shaft 14 is rotatably held by a projection 15a provided on a fixed plate 15 (not shown in FIG. 1). The lower portion of the wind-up shaft 14 is provided with a take-up spool 16 rotatably mounted thereon. The take-up spool 16 and the lower portion of the wind-up shaft 14 are frictionally coupled to each other with the intervention of a friction ring 17.

A drive gear 18 for charging a shutter is secured to the lower end of the lower portion of the wind-up shaft 14 so that the shutter is charged by rotation of the drive gear 18 by way of an intermediate gear 19. The drive gear 18 is provided with a cut-away portion 18a so that the intermediate gear 19 may be rotated reversely by a spring 20 to reversely rotate a shutter set gear for preparing for the next shutter charge when the cut-away portion 18a comes to the intermediate gear 19.

Now the operation of the above described wind-up mechanism in accordance with the present invention will be described. When the wind-up lever 2 is rotated through 120°, the upper portion of the wind-up shaft 1 is rotated together therewith. The rotation of the upper shaft 1 concurrently results in rotation of the ratchet gear 6 by way of the feed claw 4. The rotation of the ratchet gear 6 is transmitted to the gear 8 by way of the wind-up gear 6 and the intermediate gear 7, thereby rotating the sprocket shaft 9. On the other hand, the rotation of the ratchet gear 6 is transmitted to the take-up gear 13 by way of the gears 11 and 12 to rotate the lower portion of the wind-up shaft 14 360°.

The rotation of the lower shaft 14 is transmitted to the take-up spool 16 by way of the friction ring 17. Thus, the take-up spool 16 takes up a predetermined length of film fed by the sprocket 10. As the diameter of the film convolution taken up by the spool 16 increases, the angle of rotation of the spool 16 required to take up the film is reduced. Therefore, when the diameter of the film convolution is increased, the take-up spool 16 slips on the friction ring 17 as the take-up gear 13 rotates.

As the lower shaft 14 is rotated 360°, the drive gear 18 for charging the shutter is also rotated 360°. By the rotation of the drive gear 18, the intermediate gear 19 is rotated to charge a shutter mechanism. Then, when the cut-away portion 18a of the drive gear 18 comes to the intermediate gear 19, the intermediate gear 19 is reversed by the spring 20 to return to the starting position.

In accordance with the present invention as described above, there is no slippage between the wind-up shaft and the wind-up spool or spool gear since the wind-up shaft is divided into one on the wind-up lever side and the other on the take-up spool side. Accordingly, the wind-up motion can be made smoothly and lightly. Further, since the take-up spool side shaft is rotated by 360°, the shutter charging mechanism or a double exposure preventing mechanism can easily be associated therewith.

I claim:

1. A film wind-up device for a photographic camera comprising a wind up shaft having separate upper and lower shaft portions, a wind up lever operatively connected to said upper shaft portion for rotating said upper shaft portion in a first direction to wind up film in the camera, a take up spool gear secured to said lower shaft, gear train means for drivingly connecting said upper shaft portion to said take up spool gear, a take up spool rotatably mounted on said lower shaft portion, friction means for frictionally coupling said spool to said spool gear to permit respective movement therebetween; and a film drive sprocket directly driven by said gear train whereby the drive sprocket is driven through a predetermined angle of rotation on operation of the wind up lever while the take up spool will rotate with a decreasing angle of rotation as the diameter of the film convolution on the spool increases.

2. A film wind-up device for a photographic camera as defined in claim 1 wherein said lower portion of the wind-up shaft is rotated by 360° by one wind-up motion of the wind-up lever.

3. A film wind-up device as defined in claim 2 wherein said one wind-up motion of the wind-up lever is made by 120° rotation thereof.

4. A film wind-up device as defined in claim 2 wherein said lower portion of the wind-up shaft is connected with a shutter charging drive gear.

5. A film wind-up device for a photographic camera comprising a wind-up shaft, a wind-up lever secured to the wind-up shaft for manually winding up a film a spool gear connected with the wind-up shaft, and a film take-up spool driven by the spool gear for taking up a film thereon characterized in that said wind-up shaft is divided into an upper portion and a lower portion which are separately rotatable by different angles, said wind-up lever is secured to the upper portion, said spool gear is secured to the lower portion, said upper portion is connected with said spool gear via a gear train to rotate said lower portion at a higher speed than said upper portion, said take-up spool is frictionally coupled to and mounted around said spool gear.

* * * * *